United States Patent
Yang et al.

(10) Patent No.: US 9,532,162 B2
(45) Date of Patent: Dec. 27, 2016

(54) METHOD AND SYSTEM FOR INDICATING VALID TIME OF TRIGGER MESSAGE

(75) Inventors: Kun Yang, Shenzhen (CN); Hao Wu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 167 days.

(21) Appl. No.: 14/371,804

(22) PCT Filed: Apr. 25, 2012

(86) PCT No.: PCT/CN2012/074683
§ 371 (c)(1),
(2), (4) Date: Jul. 11, 2014

(87) PCT Pub. No.: WO2013/134991
PCT Pub. Date: Sep. 19, 2013

(65) Prior Publication Data
US 2015/0334508 A1   Nov. 19, 2015

(30) Foreign Application Priority Data

Mar. 15, 2012   (CN) .......................... 2012 1 0068753

(51) Int. Cl.
*H04W 4/00* (2009.01)
*H04W 4/14* (2009.01)
*H04W 4/20* (2009.01)
*H04W 88/16* (2009.01)

(52) U.S. Cl.
CPC .............. *H04W 4/005* (2013.01); *H04W 4/14* (2013.01); *H04W 4/20* (2013.01); *H04W 88/16* (2013.01)

(58) Field of Classification Search
CPC ........ H04W 4/14; H04W 88/184; H04W 4/12; H04L 12/5895
See application file for complete search history.

(56) References Cited

U.S. PATENT DOCUMENTS

| 6,714,793 B1 * | 3/2004 | Carey ................... H04L 51/04 455/412.1 |
| 7,035,638 B2 | 4/2006 | Olvera-Hernandez |

(Continued)

FOREIGN PATENT DOCUMENTS

| CN | 1443424 A | 9/2003 |
| CN | 101026833 A | 8/2007 |
| CN | 101710914 A | 5/2010 |

OTHER PUBLICATIONS

3GPP TS 23.040 V10.0.0 (Mar. 2011) 3rd Generation Partnership Project; Technical Specification Group Core Network and Terminals: Technical realization of the Short Message Service (SMS) (Release 10).*

(Continued)

*Primary Examiner* — Vladimir Magloire
*Assistant Examiner* — Ernest Tacsik
(74) *Attorney, Agent, or Firm* — Oppedahl Patent Law Firm LLC

(57) ABSTRACT

The disclosure provides a method and a system for indicating a valid time of a trigger message, to indicate the valid time of the trigger message through a validity period parameter in the trigger message. The validity period parameter includes: a validity period format and a validity period. The method further comprises: a server transmits the trigger message to a network side entity (201); and the network side entity transmits the trigger message to a terminal after successfully parsing and storing the trigger message (202). Through the method and the system, a network is capable of correctly parsing the trigger message and implementing the valid time in the trigger message and thus avoids a wrong removal of a trigger message.

8 Claims, 3 Drawing Sheets

(56) References Cited

U.S. PATENT DOCUMENTS

| | | | |
|---|---|---|---|
| 8,050,694 B2 | 11/2011 | Ramakrishna | |
| 8,909,265 B2* | 12/2014 | Xu | H04W 4/14 455/466 |
| 2004/0029598 A1* | 2/2004 | Guggisberg | H04L 12/5835 455/466 |
| 2004/0048627 A1 | 3/2004 | Olvera-Hernandez | |
| 2005/0070251 A1 | 3/2005 | Satake | |
| 2005/0085219 A1* | 4/2005 | Noldus | H04W 4/14 455/412.1 |
| 2008/0305774 A1 | 12/2008 | Ramakrishna | |
| 2009/0227251 A1* | 9/2009 | Lei | H04J 11/0069 455/425 |

OTHER PUBLICATIONS

International Search Report in international application No. PCT/CN2012/074683, mailed on Aug. 2, 2012.

English Translation of the Written Opinion of the International Search Authority in international application No. PCT/CN2012/074683, mailed on Aug. 2, 2012.

3rd Generation Partnership Project;Technical Specification Group Services and System Aspects; Architecture enhancements to facilitate communications with packet data networks and applications (Release 11), 3GPP Standard; 3GPP TS 23.682, 3rd Generation Partnership Project (3GPP), Mobile Competence Centre; 650, Route Des Lucioles ; F-06921 Sophia-Antipolis Cedex France, vol. SA WG2, No. VII.0.0, pp. 1-24, XP050555362, [retrieved on Mar. 9, 2012], mailed on Mar. 9, 2012.

3rd Generation Partnership Project; Technical Specification Group Core Network and Terminals; Technical realization of the Short Message Service (SMS) (Release 11), 3GPP Standard; 3GPP TS 23.040, 3rd Generation Partnership Project (3GPP), Mobile Competence Centre; 650, Route Des Lucioles ; F-06921 Sophia-Antipolis Cedex France, vol. CT WGI, No. VII.0.0, 20, pp. 1.202, XP050554674, mailed on Dec. 20, 2011.

Supplementary European Search Report in European application No. 12870953.2, mailed on Mar. 16, 2016.

\* cited by examiner

Fig. 1

Prior Art

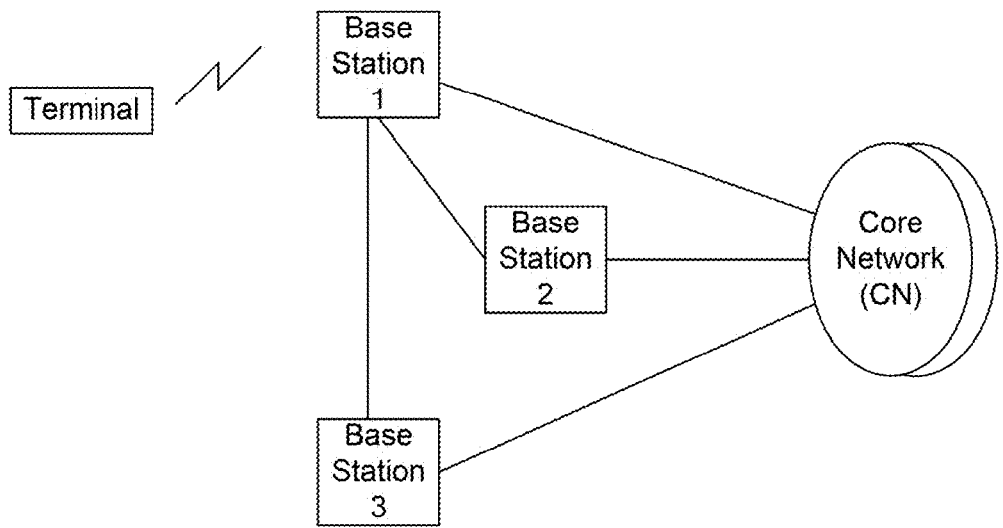

Fig. 2

A server transmits a trigger message to a network side entity, and indicates the valid time of the trigger message through a validity period parameter in the trigger message, wherein the validity period parameter includes: a validity period format and a validity period — 201

The network side entity transmits the trigger message to a terminal, after successfully parsing and storing the trigger message — 202

METHOD AND SYSTEM FOR INDICATING VALID TIME OF TRIGGER MESSAGE

TECHNICAL FIELD

The disclosure relates to the technical field of Machine Type Communication (MTC), and in particular to a method and a system for indicating a valid time of a trigger message.

BACKGROUND

Cellular wireless communication system, as shown in FIG. 1, mainly consists of a Core Network (CN), a Radio Access Network (RAN) and a terminal. The CN holds responsibility for non-access layer services (for example, update of terminal location) and serves as an anchor of user plane. The access network includes a base station or includes a base station and a base station controller, and the access network holds responsibility for access layer services (for example, management of radio resources). A physical or logical connection may exist between base stations according to actual conditions, such as the connection between the base station 1 and the base station 2 or base station 3 as shown in FIG. 1; moreover, each base station can connect with one or more core network nodes. The terminal, that is, User Equipment (UE), refers to various devices which can communicate with the cellular wireless communication network, for example, a mobile phone or notebook.

Hereinafter, an introduction is provided for following CN network elements:

Short Message Service Centre (SMS-SC), which generates the content of a short message and packages it as a short message packet according to a short message protocol;

Mobility Management Unit (Mobility Management Entity (MME) or Serving GPRS Support Node (SGSN) or Mobile Switching Centre (MSC)), which is the unit responsible for terminal access control, location information update and switch in a CN, and holds responsibility for non-access layer signalling control from the CN to a terminal and registration of the terminal in a network;

Packet Data Network Gateway (P-GW) or Gateway GPRS Support Node (GGSN), which is the network element responsible for IP address allocation, session management, PCRF selection, route selection and data forwarding, QoS control, charging, policy and charging enforcement in the CN;

Serving Gateway (S-GW), which is the network element responsible for session management, route selection and data forwarding, QoS control, charging and information storage in the CN; and Machine Type Communication-Inter Working Function entity (MTC-IWF), which is a connection entity between a mobile communication network and an external public network and can implement functions such as protocol conversion, address query and information storage. The MTC-IWF is connected to an MTC server externally and is connected to the network elements in the mobile communication network internally, such as Home Subscriber Server (HSS) and/or Home Location Register (HLR), or MME and/or SGSN and/or MSC.

In some MTC applications, for example, if a monitoring management system needs to acquire monitoring data from a monitoring terminal, it is needed to trigger, through a server, the terminal to establish a connection with the server to report the desirable data. Then, the terminal needs to respond immediately and establishes a connection with the server, after receiving a trigger message from the server. At present, in order to meet the requirement of triggering a terminal by a server, existing solutions attempt to indicate a network to remove a trigger message when the trigger message expires by including the valid time of the trigger message in the trigger message.

However, in prior art there is no mechanism for a network to correctly parse and implement the valid time of a trigger message, this inevitably causes a wrong removal of the trigger message by the network, thus resulting in a failure of triggering a terminal or a waste of network storage resources.

SUMMARY

In view of the above, the embodiment of the disclosure is intended to provide a method and a system for indicating a valid time of a trigger message, so that a network can correctly parse and implement the valid time included in the trigger message to avoid a wrong removal of the trigger message.

To this end, the technical solutions of the embodiment of the disclosure are implemented as follows.

The embodiment of the disclosure provides a method for indicating a valid time of a trigger message, which indicates the valid time of the trigger message through a validity period parameter in the trigger message, wherein the validity period parameter includes: a validity period format and a validity period; and the method may further include:

a server transmits the trigger message to a network side entity; and the network side entity transmits the trigger message to a terminal after successfully parsing and storing the trigger message.

After the network side entity fails to parse the trigger message, the method may further include:

the network side entity notifies the server that the trigger message is transmitted unsuccessfully, and that the failure cause value is: validity period format not supported and/or validity period not supported.

The validity period indicates valid time information of the trigger message, and the validity period format indicates a time format adopted by the valid time of the trigger message.

When the validity period format indicates that the time format adopted by the valid time of the trigger message is Null, the corresponding validity period indicates that the valid time information of the trigger message is Null; or, when the validity period format indicates that the time format adopted by the valid time of the trigger message is Relative format, the corresponding validity period indicates that the valid time information of the trigger message is the duration of the trigger message being valid; or, when the validity period format indicates that the time format adopted by the valid time of the trigger message is Absolute format, the corresponding validity period indicates that the valid time information of the trigger message is the end time of the trigger message being valid.

When the validity period format indicates that the time format adopted by the valid time of the trigger message is Enhanced format, the corresponding validity period indicates that the valid time information of the trigger message is the transmission times of the trigger message, and/or the validity period format and the validity period.

When the trigger message is transmitted to the terminal, the method may further include:

the network side entity sets a timer locally according to the validity period parameter, sets the valid time information of the trigger message indicated by the validity period as the value of the timer, and starts the timer.

After the terminal receives the trigger message, the method may further include:

if the trigger message is received successfully by the terminal, the network side entity is notified, and the network side entity removes the stored trigger message; or, if the trigger message is received unsuccessfully by the terminal, the network side entity is notified, and the network side entity detects the timer, and removes the stored trigger message when the timer expires.

The embodiment of the disclosure also provides a system for indicating a valid time of a trigger message, which includes: a terminal, a network side entity and a server, wherein the server is configured to transmit the trigger message to the network side entity and to indicate the valid time of the trigger message through a validity period parameter in the trigger message, wherein the validity period parameter includes: a validity period format and a validity period;

the network side entity is configured to transmit the trigger message to the terminal, after successfully parsing and storing the trigger message; and the terminal is configured to receive the trigger message transmitted from the network side entity.

The network side entity is further configured to notify the server, after failing to parse the trigger message, that the trigger message is transmitted unsuccessfully, and that the failure cause value is: validity period format not supported and/or validity period not supported.

The server is further configured to set the validity period to indicate valid time information of the trigger message, and to set the validity period format to indicate a time format adopted by the valid time of the trigger message.

The server is further configured to: when setting the validity period format to indicate that the time format adopted by the valid time of the trigger message is Null, set the corresponding validity period to indicate that the valid time information of the trigger message is Null; or, when setting the validity period format to indicate that the time format adopted by the valid time of the trigger message is Relative format, set the corresponding validity period to indicate that the valid time information of the trigger message is the duration of the trigger message being valid; or, when setting the validity period format to indicate that the time format adopted by the valid time of the trigger message is Absolute format, set the corresponding validity period to indicate that the valid time information of the trigger message is the end time of the trigger message being valid.

The server is further configured to: when setting the validity period format to indicate that the time format adopted by the valid time of the trigger message is Enhanced format, set the corresponding validity period to indicate that the valid time information of the trigger message is the transmission times of the trigger message, and/or the validity period format and the validity period.

The network side entity is further configured to: when transmitting the trigger message to the terminal, set a timer locally according to the validity period parameter, set the valid time information of the trigger message indicated by the validity period as a value of the timer and start the timer.

The terminal is further configured to notify the network side entity when receiving the trigger message successfully or unsuccessfully;

The network side entity is further configured to: remove the stored trigger message when learning that the terminal receives the trigger message successfully, or detect the timer when learning that the terminal receives the trigger message unsuccessfully, and remove the stored trigger message when the timer expires.

The method and the system provided by the embodiment of the disclosure for indicating the valid time of a trigger message can indicate the valid time of the trigger message through a validity period parameter in the trigger message, wherein the validity period parameter includes: a validity period format and a validity period, in which, the validity period indicates the valid time information of the trigger message, and the validity period format indicates the time format adopted by the valid time of the trigger message. In this way, when the valid time of a trigger message is indicated and parsed through the above steps, the method for indicating the valid time of the trigger message becomes simple and clear, and the network only needs to read the validity period format and validity period so as to correctly parse and implement the valid time in the trigger message and to remove the trigger message according to the valid time information indicated by the validity period, thereby avoiding a wrong removal of the trigger message.

BRIEF DESCRIPTION OF THE DRAWINGS

FIG. 1 shows a diagram of an existing cellular wireless communication system;

FIG. 2 shows a flowchart of a method for indicating a valid time of a trigger message according to an embodiment of the disclosure;

DETAILED DESCRIPTION

Figure 3:
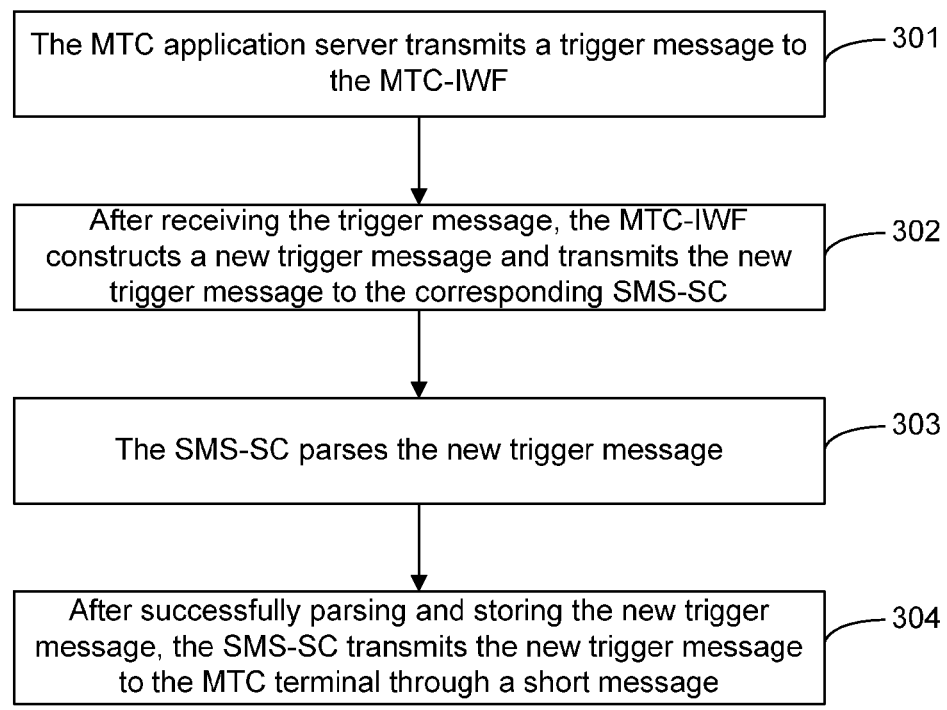
FIG. 3 shows a flowchart of a method for indicating a valid time of a trigger message according to a first embodiment of the disclosure.
Figure 4:
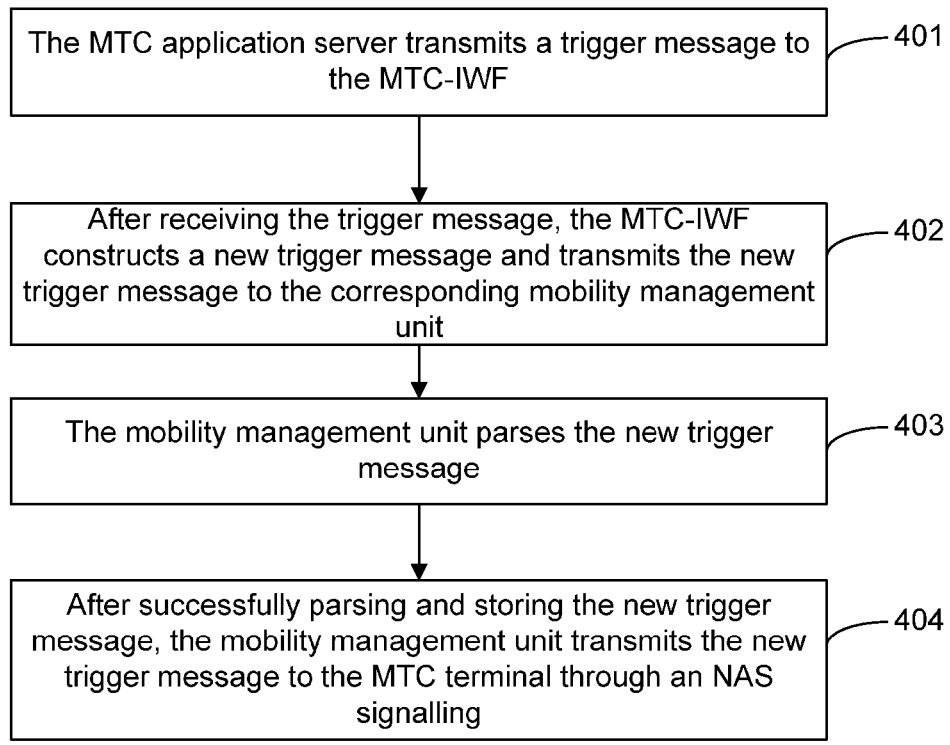
FIG. 4 shows a flowchart of a method for indicating a valid time of a trigger message according to a second embodiment of the disclosure.
Figure 5:
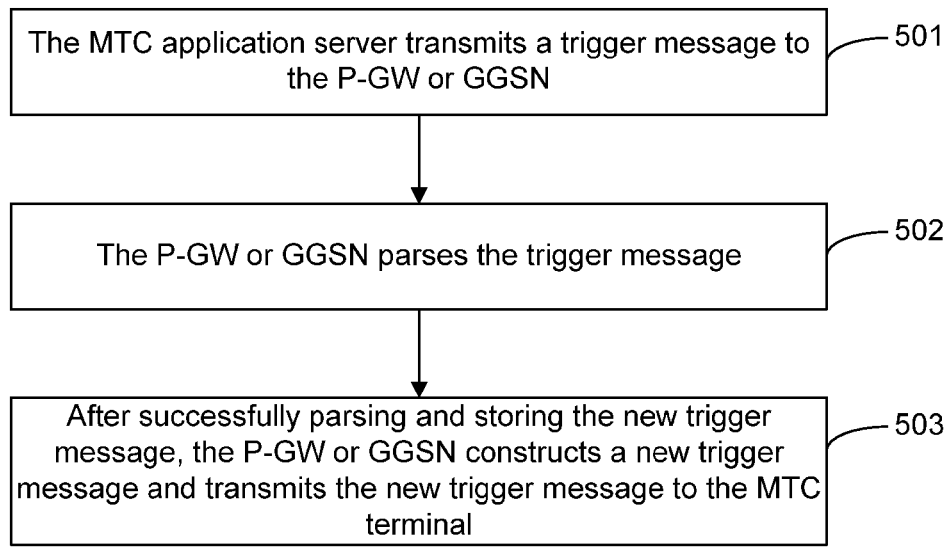
FIG. 5 shows a flowchart of a method for indicating a valid time of a trigger message according to a third embodiment of the disclosure.

The basic idea of the solutions provided by the embodiment of the disclosure for indicating the valid time of a trigger message is: indicating the valid time of the trigger message through a validity period parameter in the trigger message, wherein the validity period parameter includes: a validity period format and a validity period; as shown in FIG. 2, the process of indicating the valid time of a trigger message according to an embodiment of the disclosure includes:

Step 201: A server transmits the trigger message to a network side entity.

Step 202: The network side entity transmits the trigger message to a terminal after successfully parsing and storing the trigger message.

Preferably, after the network side entity fails to parse the trigger message, the network side entity notifies the server that the trigger message is transmitted unsuccessfully. and that the failure cause value is: validity period format not supported and/or validity period not supported.

In the embodiment of the disclosure, it is configured that the validity period indicates valid time information of the trigger message, and the validity period format indicates a time format adopted by the valid time of the trigger message.

Specifically, the type of time format and the content of the corresponding valid time information of the trigger message include the following cases:

Case 1: when the validity period format indicates that the time format adopted by the valid time of the trigger message is Null, the corresponding validity period indicates that the valid time information of the trigger message is Null;

Case 2: when the validity period format indicates that the time format adopted by the valid time of the trigger message is Relative format, the corresponding validity period indicates that the valid time information of the trigger message is the duration of the trigger message being valid; and Case 3: when the validity period format indicates that the time format adopted by the valid time of the trigger message is Absolute format, the corresponding validity period indicates that the valid time information of the trigger message is the end time of the trigger message being valid.

Based on the above three cases, a fourth case further exists too.

Case 4: when the validity period format indicates that the time format adopted by the valid time of the trigger message is Enhanced format, the corresponding validity period indicates that the valid time information of the trigger message is the transmission times of the trigger message, and/or the validity period format and the validity period.

Specifically, the type of time format and the content of the corresponding valid time information of the trigger message are illustrated through subsequent embodiments.

Based on the validity period parameter set by the embodiment of the disclosure, when the network side entity transmits the trigger message to the terminal, the above process further includes: the network side entity sets a timer locally according to the validity period parameter, sets the valid time information of the trigger message indicated by the validity period as a value of the timer, and starts the timer.

When the trigger message is received successfully by the terminal, the network side entity is notified; and the network side entity removes the stored trigger message; or, when the trigger message is received unsuccessfully by the terminal, the network side entity is notified; and the network side entity detects the timer, and removes the stored trigger message when the timer expires. Specifically, in the case that the trigger message is received unsuccessfully by the terminal, the removal of trigger message includes several cases that are illustrated through subsequent embodiments.

The network side entity may be one of SMS-SC, mobility management unit, P-GW and GGSN, wherein the mobility management unit is MME and/or SGSN and/or MSC.

Hereinafter, the solutions of the embodiment of the disclosure are described by taking an MTC application as an example, wherein the server is an MTC application server and the terminal is an MTC terminal.

Embodiment 1

In this embodiment, the network side entity is SMS-SC. As shown in FIG. 3, the process of indicating the valid time of a trigger message includes:

Step 301: When the MTC application server needs to acquire real-time data from the MTC terminal, the MTC application server directly transmits a trigger message to the MTC-IWF.

The trigger message includes: an external identification of MTC terminal, an application identification, an address of MTC application server, and the valid time of the trigger message.

Specifically, the external identification of the MTC terminal refers to the identification used by the MTC terminal beyond the mobile communication network, for example, External ID; the application identification refers to the identification of the application to which the real-time data belongs when the MTC application server needs to acquire the real-time data from the MTC terminal, and the application identification is mainly used to identify the type of the triggered application.

In the embodiment of the disclosure, the valid time of the trigger message is indicated by a validity period parameter. The validity period parameter includes two parts, namely, validity period format and validity period.

Specifically, the validity period indicates valid time information of the trigger message, and the validity period format indicates a time format adopted by the valid time of the trigger message.

In the embodiment of the disclosure, the specific representation modes of the validity period parameter may include but not limited to the following modes:

Mode 1

Validity Period Format (VPF): Null

Validity Period (VP): Null

At this time, the validity period parameter contained in the trigger message, for instance, is as follows.

The value of VPF is 0.

The value of VP is 0.

This condition indicates that there is no limit to the valid time of the trigger message.

Mode 2

VPF: indicating that the valid time of the trigger message adopts a Relative format;

VP: indicating that the valid time of the trigger message is the duration of the trigger message being valid (the value may be the number of seconds, minutes, hours, days or months).

At this time, the validity period parameter contained in the trigger message, for instance, is as follows.

The value of VPF is 1.

The value of VP is an integer between 0 and 255.

Specifically, the value of the duration corresponding to an integer between 0 and 255 can be parsed in accordance with Table 1.

TABLE 1

| VP | Value of Duration |
|---|---|
| 0-143 | (VP + 1) × 5 minutes (with an interval of 5 minutes to 12 hours) |
| 144-167 | 12 hours + (VP-143) × 30 minutes |
| 168-196 | (VP-166) × 1 day |
| 197-255 | (VP-192) × 1 month |

When the trigger message is parsed, the values of VPF and VP are read first, and then the value of the VP is parsed according to the value of the VPF. In this embodiment, the value of VPF is 1, and, according to the preset parsing method, it can be learned that the valid time of the trigger message adopts Relative format; then, the value (an integer between 0 and 255) of the VP is parsed according to the preset parsing method (shown in Table 1) corresponding to the Relative format to obtain the duration of the trigger message being valid.

Mode 3

VPF: indicating that the valid time of the trigger message adopts an Absolute format.

VP: indicating that the valid time of the trigger message is the end time of the trigger message being valid (the value may be "year+month+day+hour+minute+second+time zone").

It should be noted that the "time zone" information may indicate the difference between the local time of the network side entity and the Greenwich Mean Time (GMT), for example, expressed by a granularity of ¼ hour interval; the time zone information also can indicate a specific time zone, for example, GMT, GMT+8:00. In addition, the "time zone" information must distinguish Daylight Saving Time (DST) from Standard time.

At this time, the validity period parameter contained in the trigger message, for instance, is as follows.

The value of VPF is 2.

The value of VP is a string of numbers.

Preferably, different parts of the string of numbers correspond to year, month, day, hour, minute, second and time zone information respectively. Through the parsing of this string of numbers, the values corresponding to year, month, day, hour, minute, second and time zone can be obtained and they can be combined to form a specific time value to indicate the end time of the trigger message being valid.

When the trigger message is parsed, the values of VPF and VP are read first, and then the value of the VP is parsed according to the value of the VPF. In this embodiment, the value of VPF is 2, and, according to the preset parsing method, it can be learned that the valid time of the trigger message adopts the Absolute format; at this time, the value (a string of numbers) of the VP is parsed according to the preset parsing method corresponding to the Absolute format to obtain the end time of the trigger message being valid; for example, as shown in Table 2, according to the parsing method, the "year", "month", "day", "hour", "minute" and "second" can indicate the end time of the trigger message being valid based on the local time of the network side entity, also can indicate the end time of the trigger message being valid based on the GMT; the time zone (difference) indicates the difference between the local time of the network side entity and the GMT, wherein the time indicated by the "year", "month", "day", "hour", "minute" and "second" can be corrected according to the time zone (difference) to obtain the final end time of the trigger message being valid.

TABLE 2

| VP | Year | Month | Day | Hour | Minute | Second | Time Zone (Difference) |
|---|---|---|---|---|---|---|---|
| Numerical Value | 2012 | 12 | 21 | 15 | 14 | 35 | 32 × 15 |

As shown in Table 3, according to the preset parsing method corresponding to the Absolute format, the parsed end time of validity period is 2012-12-21-15-14-35 in time zone GMT+8:00.

TABLE 3

| VP | Year | Month | Day | Hour | Minute | Second | Time Zone |
|---|---|---|---|---|---|---|---|
| Numerical Value | 2012 | 12 | 21 | 15 | 14 | 35 | GMT +8:00 |

Mode 4

VPF: indicating that the valid time of the trigger message adopts an Enhanced format.

VP: the content includes: transmission times of trigger message (once or many times) and/or VPF+VP.

At this time, the validity period parameter contained in the trigger message, for instance, is as follows:

The value of VPF is 3.

The value of VP is a string of numbers. Different parts of this string of numbers correspond to "transmission times", "VPF" and "VP" respectively.

When the trigger message is parsed, the values of VPF and VP are read first, and then the value of the VP is parsed according to the value of the VPF. In this embodiment, the value of VPF is 3, and, according to the preset parsing method, it can be learned that the VPF is an Enhanced format; at this time, the value of the VP is parsed according to the preset parsing method corresponding to the Enhanced format to obtain the valid time information of the trigger message (null or the duration of the valid time of the trigger message or the end time of the valid time of the trigger message); for example, as shown in Table 4.

TABLE 4

| VP | Transmission Times | Period Format | Period Value |
|---|---|---|---|
| Numerical value | 1 | 0 | 0 |
|  |  | 1 | 0-255 |
|  |  | 2 | A string of numbers (year + month + day + hour + minute + second + time zone) |

It should be noted that the MTC application server sets the values of VPF and VP according to a parsing method agreed with the network side entity when constructing a trigger message; in this way, when parsing the trigger message, the network side entity can parse the values of VPF and VP according to the agreed parsing mode after reading the values of VPF and VP, to finally obtain the valid time of the trigger message.

To sum up, the values of VPF and VP may be expressed by many ways but not limited to the above examples.

Step 302: After receiving the trigger message, the MTC-IWF constructs a new trigger message and transmits the new trigger message to a corresponding SMS-SC through a trigger request signalling, specifically, a local database of the MTC-IWF stores a mapping table between an external ID and an internal ID of a MTC terminal and a mapping table between the internal ID and the SMS-SC.

The MTC-IWF parses the trigger message, searches the internal ID (for example, International Mobile Station Identity (MI)) of the MTC terminal corresponding to the external ID contained in the trigger message according to the mapping table between the external ID and the internal ID stored in the local database, and searches, according to the internal ID, the SMS-SC (the corresponding SMS-SC) in which the MTC terminal is located according to the mapping table between internal ID and SMS-SC stored in the local database. Then, the MTC-IWF constructs a new trigger message by replacing the external ID contained the original trigger message with the internal ID of the MTC terminal, and transmits the new trigger message to the SMS-SC through the trigger request signalling.

The new trigger message not only includes: the internal ID of the MTC terminal, an application ID, the address of the MTC application server and the valid time of the trigger message, but also includes: MTC terminal routing information provided by the MTC-IWF (that is, the address of the serving MME and/or SGSN and/or MSC of the MTC terminal).

Step 303: After receiving the trigger request signalling, the SMS-SC parses the trigger message contained in the signalling.

If the SMS-SC successfully parses the valid time contained in the trigger message, that is to say, the validity period parameter is correct, the SMS-SC stores this trigger message and submits an acknowledgement message to the MTC application server through a trigger request submission acknowledgement signalling, to notify the MTC application server that the trigger message is stored. Then, proceed to Step 304.

If the SMS-SC fails to parse the valid time of the trigger message contained in the trigger message due to an error of the validity period parameter, the SMS-SC submits an acknowledgement message to the MTC application server through a trigger request submission acknowledgement signalling, to notify the MTC application server that the trigger message is transmitted unsuccessfully, the acknowledge message containing a failure cause value "VPF not supported" and/or "VP not supported". The process is ended.

Step 304: After successfully parsing and storing the new trigger message, the SMS-SC constructs a new short message carrying the new trigger message, that is, making the trigger message as an element of this short message, and transmits this short message to the MTC terminal through the corresponding MME and/or SGSN and/or MSC according to the MTC terminal routing message contained in the trigger message.

Meanwhile, the SMS-SC sets a trigger message timer T1 locally, sets the value of the timer T1 locally according to the validity period parameter and starts the timer T1.

If the MTC terminal receives the trigger message successfully, the MTC terminal notifies the SMS-SC, through a transmission report, that the trigger message is transmitted successfully; after receiving the transmission report of the trigger message and confirming that the trigger message is successfully transmitted to the MTC terminal, the SMS-SC removes the trigger message stored in itself and notifies the MTC application server that the trigger message is successfully transmitted.

If the MTC terminal receives the trigger message unsuccessfully, the MTC terminal notifies the SMS-SC, through a transmission report, that the trigger message is transmitted unsuccessfully; then, the SMS-SC detects the timer T1 locally and removes the trigger message stored in the SMS-SC itself when the timer T1 expires, and notifies the MTC application server that the trigger message is transmitted unsuccessfully.

Specifically, setting the value of the timer T1 locally according to the validity period parameter includes that: the SMS-SC parses the trigger message, reads the values of VPF and VP, parses the value of the VPF according to a preset parsing method to obtain the time format adopted by the valid time of the trigger message, and parses the value of the VP according to the parsing method corresponding to the time format adopted by the valid time of the trigger message to obtain valid time information of the trigger message, and sets the valid time information of the trigger message as the value of the timer T1.

Depending on the modes of the valid period parameter, setting timer T1 and removing trigger message specifically include the following conditions:

Condition 1: VPF is Null.

If the value of VPF is 0, it can be learned through parsing that the VPF is Null, then, the value of VP is 0, and the value of timer T1 is set to 0, that is to say, there is no limit to the valid time of the trigger message; then, the SMS-SC removes the trigger message stored in itself, only when confirming that the trigger message is successfully transmitted to the MTC terminal; otherwise, the SMS-SC keeps attempting to transmit the trigger message to the MTC terminal until confirming that the trigger message is successfully transmitted to the MTC terminal.

Condition 2: VPF is a Relative format.

If the value of VPF is 1, it can be learned through parsing that the VPF is a Relative format, then the value of VP can be parsed through the parsing method corresponding to the Relative format; supposing the value of VP is 145, according to the parsing method shown in Table 1, it can be obtained through parsing that the valid time information of the trigger message is: the duration of the trigger message being valid is 13 hours; then, the value of timer T1 is set to 13 hours. When the SMS-SC confirms that the trigger message fails to be transmitted to the MTC terminal, the SMS-SC detects the timer T1; if the SMS-SC confirms that the trigger message is successfully transmitted to the MTC terminal within 13 hours after the timing of the timer T1, the SMS-SC removes the trigger message stored in itself after confirming that the trigger message is successfully transmitted to the MTC terminal; otherwise, the SMS-SC removes the trigger message stored in itself after 13 hours, that is, when the timer T1 expires.

Condition 3: VPF is an Absolute format.

If the value of VPF is 2, it can be learned through parsing that the VPF is an

Absolute format, then the value of VP can be parsed through the parsing method corresponding to the Absolute format; supposing the parsed valid time of the trigger message is that: the end time of the trigger message being valid is 2012-03-13-22-30-30 in time zone GMT+8:00, then the value of timer T1 is set to 2012-03-13-22-30-30 in time zone GMT+8:00. When the SMS-SC confirms that the trigger message fails to be transmitted to the MTC terminal, the SMS-SC detects the timer T1; if the SMS-SC confirms that the trigger message is successfully transmitted to the MTC terminal before 2012-03-13-22-30-30 in time zone GMT+8:00, the SMS-SC removes the trigger message stored in itself after confirming that the trigger message is successfully transmitted to the MTC terminal; otherwise, after 2012-03-13-22-30-30 in time zone GMT+8:00, that is, when the timer T1 expires, the SMS-SC removes the trigger message stored in itself.

Through the above two examples, it can be learned that: in the embodiment of the disclosure, in the case that the transmission times of the trigger message is not limited, the SMS-SC detects the timer T1 when confirming that the trigger message fails to be transmitted to the MTC terminal; if the SMS-SC can confirm that the trigger message is successfully transmitted to the MTC terminal before the timer T1 expires, the SMS-SC removes the trigger message when confirming that the trigger message is successfully transmitted to the MTC terminal; otherwise, the SMS-SC removes the trigger message when the timer T1 expires. That is to say, when the SMS-SC confirms that the trigger message fails to be transmitted to the MTC terminal the first time, the SMS-SC can keep attempting to transmit the trigger message to the MTC terminal before the timer T1 expires.

Condition 4: VPF is an Enhanced format.

If the value of VPF is 3, it can be learned through parsing that the VPF is an Enhanced format, then the value of VP can be parsed through the parsing method corresponding to the Enhanced format; supposing the parsed valid time of trigger message is that: transmission times is equal to 2; then, when the SMS-SC confirms that the trigger message fails to be transmitted to the MTC terminal (the trigger message is removed in the case of successful transmission, without a second time transmission), the SMS-SC retransmits the trigger message to the MTC terminal; then, the SMS-SC can remove the trigger message, no matter the trigger message is successfully transmitted to the MTC or unsuccessfully transmitted to the MTC. Supposing the parsed valid time information of trigger message is: transmission times is equal to 1 and the duration of the trigger message being valid is 13 hours; then, the SMS-SC can remove the trigger message, when confirming that the trigger message fails to be transmitted to the MTC terminal and the timer T1 does not expire; if the timer T1 expires while the maximum transmission times is not reached, the SMS-SC also can remove the trigger message. If the parsed valid time information of trigger message has no limit to transmission times, the specific condition is the same as that in above conditions 2 and 3, and the detailed description thereof will be omitted.

Embodiment 2

In this embodiment, the network side entity is a mobility management unit (MME and/or SGSN and/or MSC).

Step 401 is the same as Step 301, and the detailed description thereof will be omitted.

Step 402: After receiving the trigger message, the MTC-IWF constructs a new trigger message and transmits the new trigger message to a corresponding mobility management unit through a trigger request signalling, specifically, a local database of the MTC-IWF stores a mapping table between an external ID and an internal ID of the MTC terminal and a mapping table between the internal ID and the mobility management unit.

The MTC-IWF parses the trigger message, searches the internal ID (for example, IMSI) of the MTC terminal corresponding to the external ID contained in the trigger message according to the mapping table between the external ID and the internal ID stored in the local database, and searches, according to the internal ID, the mobility management unit in which the MTC terminal is located according to the mapping table between internal ID and mobility management unit stored in the local database. Then, the MTC-IWF constructs a new trigger message by replacing the external ID contained the original trigger message with the internal ID of the MTC terminal, and transmits the new trigger message to the mobility management unit through the trigger request signalling.

The new trigger message includes: the internal ID of the MTC terminal, an application ID, the address of the MTC application server and the valid time of the trigger message.

Step 403: After receiving the trigger request signalling, the mobility management unit parses the trigger message contained in the signalling.

If the mobility management unit successfully parses the valid time contained in the trigger message, that is to say, the validity period parameter is correct, the mobility management unit stores this trigger message and notifies the MTC application server, through a transmission report, that the trigger message is stored. Then, proceed to Step 404.

If the mobility management unit fails to parse the valid time of the trigger message contained in the trigger message due to an error of the validity period parameter, the mobility management unit notifies the MTC application server, through a transmission report, that the trigger message is transmitted unsuccessfully, the report containing a failure cause value "VPF not supported" and/or "VP not supported". The process is ended.

Step 404: After successfully parsing and storing the new trigger message, the mobility management unit searches in the local database to obtain the state of the MTC terminal according to the internal ID of the MTC terminal contained in the trigger message. If the MTC terminal is in an idle state, the mobility management unit transmits a paging message to the MTC terminal; after receiving the paging message, the MTC terminal transmits a service request to the mobility management unit to request establishment of a Non-Access Stratum (NAS) connection with the mobility management unit. After the establishment of NAS connection is completed, the mobility management unit packages the stored trigger message into an NAS signalling (for example, downlink NAS transmission report: Downlink NAS transport), that is to say, this trigger message is transmitted to the MTC terminal as an element of the NAS signalling. If the MTC terminal is in connection, the mobility management unit directly packages the stored trigger message into an NAS signalling (for example, Downlink NAS transport) to transmit to the MTC terminal.

Meanwhile, the mobility management unit sets locally a trigger message timer (supposing MME sets timer T2 and/or SGSN sets timer T3 and/or MSC sets timer T4), sets the value of the timer T2 and/or T3 and/or T4 locally according to the validity period parameter, and starts the timer T2 and/or T3 and/or T4.

If the MTC terminal receives the trigger message successfully, the MTC terminal notifies the mobility management unit, through a transmission report, that the trigger message is transmitted successfully; after receiving the transmission report of the trigger message and confirming that the trigger message is successfully transmitted to the MTC terminal, the mobility management unit removes the trigger message stored in itself and notifies the MTC application server that the trigger message is successfully transmitted.

If the MTC terminal receives the trigger message unsuccessfully, the MTC terminal notifies the mobility management unit, through a transmission report, that the trigger message is transmitted unsuccessfully; then, the mobility management unit detects the timer T2 and/or T3 and/or T4 locally and removes the trigger message stored in the mobility management unit itself when the timer T2 and/or T3 and/or T4 expires, and notifies the MTC application server that the trigger message is transmitted unsuccessfully.

In this embodiment, the method for setting the value of the timer T2 and/or T3 and/or T4 locally according to the validity period parameter is the same as the method for setting the value of the timer T1 in Embodiment 1, and the detailed description thereof will be omitted.

According to the modes of the validity period parameter, the specific conditions of setting timer T2 and/or T3 and/or T4 and removing trigger message are the same as those in Embodiment 1 (it is only needed to replace the SMS-SC in Embodiment 1 by a mobility management unit), and the detailed description thereof will be omitted.

Embodiment 3

In this embodiment, the network side entity is a P-GW or GGSN.

Step 501: When the MTC application server needs to acquire real-time data from the MTC terminal, the MTC application server searches the IP address of the MTC terminal in a local database according to the external ID of the MTC terminal, constructs an IP packet, makes the trigger message as one element of the IP packet and transmits the IP packet to the P-GW or GGSN according to the IP address and port number of the MTC terminal.

When the MTC terminal is registered in a network, the MTC application server would store the current IP address and port number of the MTC terminal.

The trigger message includes: the external identification of the MTC terminal, an application identification, the address of the MTC application server, and the valid time of the trigger message.

In this embodiment, the specific mode of the validity period parameter is the same as that in Step 301 in Embodiment 1, and the detailed description thereof will be omitted.

Step 502: After receiving the IP packet, the P-GW or GGSN parses the trigger message contained in the IP packet.

If the P-GW or GGSN successfully parses the valid time contained in the trigger message, that is to say, the validity period parameter is correct, the P-GW or GGSN stores this trigger message and notifies the MTC application server, through a transmission report, that the trigger message is stored. Then, proceed to Step 503.

If the P-GW or GGSN fails to parse the valid time of the trigger message contained in the trigger message due to an error of the validity period parameter, the P-GW or GGSN notifies the MTC application server, through a transmission report, that the trigger message is transmitted unsuccessfully, the report containing a failure cause value "VPF not supported" and/or "VP not supported". The process is ended.

Step 503: the P-GW or GGSN constructs a new trigger message and transmits the new trigger message to the MTC terminal.

The P-GW or GGSN stores a mapping table between an external ID and an internal ID of the MTC terminal in the local database. After the P-GW or GGSN successfully parses and stores the trigger message, the P-GW or GGSN constructs a new trigger message by replacing the external ID contained the original trigger message with the internal ID of the MTC terminal, and meanwhile constructs a new IP packet, makes the new trigger message as an information element of the new IP packet and transmits the new IP packet to the MTC terminal according to the IP address and port number of the MTC terminal.

Meanwhile, the P-GW or GGSN sets locally a trigger message timer T5 or T6, sets the value of the timer T5 or T6 locally according to the validity period parameter, and starts the timer T5 or T6.

If the MTC terminal receives the trigger message successfully, the MTC terminal notifies the P-GW or GGSN, through a transmission report, that the trigger message is transmitted successfully; after receiving the transmission report of the trigger message and confirming that the trigger message is successfully transmitted to the MTC terminal, the P-GW or GGSN removes the trigger message stored in itself and notifies the MTC application server that the trigger message is successfully transmitted.

If the MTC terminal receives the trigger message unsuccessfully, the MTC terminal notifies the P-GW or GGSN, through a transmission report, that the trigger message is transmitted unsuccessfully; then, the P-GW or GGSN detects the timer T5 and/or T6 locally and removes the trigger message stored in the P-GW or GGSN itself when the timer T5 and/or T6 expires, and notifies the MTC application server that the trigger message is transmitted unsuccessfully.

In this embodiment, the method for setting the value of the timer T5 and/or T6 locally according to the validity period parameter is the same as the method for setting the value of the timer T1 in Embodiment 1, and the detailed description thereof will be omitted.

In order to implement the above method, the embodiment of the disclosure also provides a system for indicating a valid time of a trigger message, including: a terminal, a network side entity and a server, wherein the server is configured to transmit the trigger message to the network side entity and to indicate the valid time of the trigger message through a validity period parameter in the trigger message, wherein the validity period parameter includes: a validity period format and a validity period;

the network side entity is configured to transmit the trigger message to the terminal, after successfully parsing and storing the trigger message; and the terminal is configured to receive the trigger message transmitted from the network side entity.

The network side entity is further configured to notify the server, after failing to parse the trigger message, that the trigger message is transmitted unsuccessfully, and that the failure cause value is: validity period format not supported and/or validity period not supported.

The server is further configured to set the validity period to indicate valid time information of the trigger message and to set the validity period format to indicate a time format adopted by the valid time of the trigger message.

The server is further configured to: when setting the validity period format to indicate that the time format adopted by the valid time of the trigger message is Null, set the corresponding validity period to indicate that the valid time information of the trigger message is Null; or, when setting the validity period format to indicate that the time format adopted by the valid time of the trigger message is Relative format, set the corresponding validity period to indicate that the valid time information of the trigger message is the duration of the trigger message being valid; or, when setting the validity period format to indicate that the time format adopted by the valid time of the trigger message is Absolute format, set the corresponding validity period to indicate that the valid time information of the trigger message is the end time of the trigger message being valid.

The server is further configured to: when setting the validity period format to indicate that the time format adopted by the valid time of the trigger message is Enhanced format, set the corresponding validity period to indicate that the valid time information of the trigger message is the transmission times of the trigger message, and/or the validity period format and the validity period.

The network side entity is further configured to: when transmitting the trigger message to the terminal, set a timer locally according to the validity period parameter, set the valid time information of the trigger message indicated by the validity period as a value of the timer and start the timer.

The terminal is further configured to notify the network side entity when receiving the trigger message successfully or unsuccessfully.

The network side entity is further configured to: remove the stored trigger message when learning that the terminal receives the trigger message successfully, or detect the timer when learning that the terminal receives the trigger message unsuccessfully, and remove the stored trigger message when the timer expires.

The above are the preferred embodiments of the disclosure, and are not intended to limit the scope of protection of the disclosure.

The invention claimed is:

1. A method for indicating a valid time of a trigger message, which indicates the valid time of the trigger message through a validity period parameter in the trigger message, wherein the validity period parameter includes: a validity period format and a validity period; and the method further comprises:
   transmitting, by a server, the trigger message to a network side entity; and
   transmitting, by the network side entity, the trigger message to a terminal after successfully parsing and storing the trigger message;
   wherein the validity period indicates valid time information of the trigger message, and the validity period format indicates a time format adopted by the valid time of the trigger message;
   wherein when the validity period format indicates that the time format adopted by the valid time of the trigger message is an Enhanced format, the corresponding validity period indicates that the valid time information of the trigger message is the transmission times of the trigger message, and the validity period format and the validity period;
   wherein when the trigger message is transmitted to the terminal, the method further comprises: setting, by the network side entity, a timer locally according to the validity period parameter, setting the valid time information of the trigger message indicated by the validity period as a value of the timer, and starting the timer; and
   wherein after the terminal receives the trigger message, the method further comprises: when the trigger message is received unsuccessfully by the terminal, notifying the network side entity; detecting, by the network side entity, the timer, and removing the stored trigger message when the timer expires.

2. The method according to claim 1, wherein after the network side entity fails to parse the trigger message, the method further comprises:
   notifying, by the network side entity, the server that the trigger message is transmitted unsuccessfully, and that a failure cause value is: validity period format not supported and/or validity period not supported.

3. The method according to claim 1, wherein
   when the validity period format indicates that the time format adopted by the valid time of the trigger message is Null, the corresponding validity period indicates that the valid time information of the trigger message is Null; or,
   when the validity period format indicates that the time format adopted by the valid time of the trigger message is a Relative format, the corresponding validity period indicates that the valid time information of the trigger message is the duration of the trigger message being valid; or,
   when the validity period format indicates that the time format adopted by the valid time of the trigger message is an Absolute format, the corresponding validity period indicates that the valid time information of the trigger message is the end time of the trigger message being valid.

4. A system for indicating a valid time of a trigger message, including: a terminal, a network side entity and a server, wherein
   the server is configured to transmit the trigger message to the network side entity and to indicate the valid time of the trigger message through a validity period parameter in the trigger message, wherein the validity period parameter includes: a validity period format and a validity period;
   the network side entity is configured to transmit the trigger message to the terminal, after successfully parsing and storing the trigger message; and
   the terminal is configured to receive the trigger message transmitted from the network side entity;
   the server is further configured to set the validity period to indicate valid time information of the trigger message, and to set the validity period format to indicate a time format adopted by the valid time of the trigger message;
   the server is further configured to: when setting the validity period format to indicate that the time format adopted by the valid time of the trigger message is an Enhanced format, set the corresponding validity period to indicate that the valid time information of the trigger message is the transmission times of the trigger message, and the validity period format and the validity period;
   the network side entity is further configured to: when transmitting the trigger message to the terminal, set a timer locally according to the validity period parameter, set the valid time information of the trigger message indicated by the validity period as a value of the timer and start the timer;
   the terminal is further configured to notify the network side entity when receiving the trigger message unsuccessfully; and
   the network side entity is further configured to: detect the timer when learning that the terminal receives the trigger message unsuccessfully, and remove the stored trigger message when the timer expires.

5. The system according to claim 4, wherein
   the network side entity is further configured to notify the server, after failing to parse the trigger message, that the trigger message is transmitted unsuccessfully, and that a failure cause value is: validity period format not supported and/or validity period not supported.

6. The system according to claim 4, wherein
   the server is further configured to: when setting the validity period format to indicate that the time format adopted by the valid time of the trigger message is Null, set the corresponding validity period to indicate that the valid time information of the trigger message is Null; or,
   when setting the validity period format to indicate that the time format adopted by the valid time of the trigger message is Relative format, set the corresponding validity period to indicate that the valid time information of the trigger message is the duration of the trigger message being valid; or,
   when setting the validity period format to indicate that the time format adopted by the valid time of the trigger message is an Absolute format, set the corresponding validity period to indicate that the valid time information of the trigger message is the end time of the trigger message being valid.

7. The system according to claim 4, wherein
   the terminal is further configured to notify the network side entity when receiving the trigger message successfully;
   the network side entity is further configured to: remove the stored trigger message when learning that the terminal receives the trigger message successfully.

8. The method according to claim 1, wherein after the terminal receives the trigger message, the method further comprises:
when the trigger message is received successfully by the terminal, notifying the network side entity; removing, by the network side entity, the stored trigger message.

* * * * *